(12) United States Patent
Suga et al.

(10) Patent No.: US 12,052,679 B2
(45) Date of Patent: Jul. 30, 2024

(54) WIRELESS COMMUNICATION SYSTEM, ACCESS POINT APPARATUS, WIRELESS STATION APPARATUS AND WIRELESS COMMUNICATION METHOD

(71) Applicant: NIPPON TELEGRAPH AND TELEPHONE CORPORATION, Tokyo (JP)

(72) Inventors: Mizuki Suga, Musashino (JP); Nobuaki Otsuki, Musashino (JP); Kota Ito, Musashino (JP); Naoki Kita, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 467 days.

(21) Appl. No.: 17/414,593

(22) PCT Filed: Dec. 12, 2019

(86) PCT No.: PCT/JP2019/048620
§ 371 (c)(1),
(2) Date: Jun. 16, 2021

(87) PCT Pub. No.: WO2020/129790
PCT Pub. Date: Jun. 25, 2020

(65) Prior Publication Data
US 2022/0141788 A1 May 5, 2022

(30) Foreign Application Priority Data
Dec. 19, 2018 (JP) .................................. 2018-237632

(51) Int. Cl.
*H04W 56/00* (2009.01)

(52) U.S. Cl.
CPC ..... *H04W 56/0045* (2013.01); *H04W 56/001* (2013.01)

(58) Field of Classification Search
CPC .................. H04W 56/0045; H04W 56/001
See application file for complete search history.

(56) References Cited

U.S. PATENT DOCUMENTS

2014/0079052 A1   3/2014  Senoo
2017/0163452 A1*  6/2017  Breiling ............ H04L 25/03159
(Continued)

FOREIGN PATENT DOCUMENTS

JP      2008167010 A      7/2008
WO   WO-2012172628 A1  12/2012

OTHER PUBLICATIONS

Yusei Okamoto et al., Throughput improvement of Wireless LAN system with RoF employing AP control, IEICE Technical Report, vol. 112, No. 443, 2013, pp. 97-102.
(Continued)

*Primary Examiner* — Won Tae C Kim
(74) *Attorney, Agent, or Firm* — Harness, Dickey & Pierce, P.L.C.

(57) ABSTRACT

An AP 3 and STAs 5 acquire time information from an external device, and synchronize time. The AP 3 sets, in a first signal, a transmission start time of the first signal, and transmits the first signal to the STA 5. The STAs 5 transmit, to the AP 3, a second signal in which a delay time is set, the delay time being calculated from a difference between the transmission start time acquired from the first signal and a reception start time of the first signal at the own station. The AP 3 acquires delay time from the second signal of each STA 5, decides a timing for permitting transmission by each of the STAs 5 by time division, on the basis of the acquired delay time, and notifies the STAs 5 thereof. The STAs 5 each
(Continued)

effect control to start transmission of signals to the AP 3 at the timing notified from the AP 3.

5 Claims, 11 Drawing Sheets

(56) References Cited

U.S. PATENT DOCUMENTS

2018/0192431 A1* 7/2018 Wang .................... H04W 72/52
2020/0053774 A1* 2/2020 Inoki .................... H04W 48/20

OTHER PUBLICATIONS

IEEE Standard for Information technology—Telecommunications and information exchange between systems—Local and metropolitan area networks—Specific requirements Part 3: Carrier Sense Multiple Access with Collision Detection (CSMA/CD) Access Method and Physical Layer Specifications, IEEE Std 802.3ah-2004, Sep. 7, 2004, pp. 439-471.

* cited by examiner

WIRELESS COMMUNICATION SYSTEM, ACCESS POINT APPARATUS, WIRELESS STATION APPARATUS AND WIRELESS COMMUNICATION METHOD

CROSS-REFERENCE TO RELATED APPLICATIONS

This application is a 371 U.S. National Phase of International Application No. PCT/JP2019/048620 filed on Dec. 12, 2019, which claims priority to Japanese Application No. 2018-237632 filed on Dec. 19, 2018. The entire disclosures of the above applications are incorporated herein by reference.

TECHNICAL FIELD

The present invention relates to a wireless communication system, an access point device, a wireless station device, and a wireless communication method.

BACKGROUND ART

Usage of the millimeter-wave band to handle increase in demand for wireless communication is attracting attention in recent years. A broader bandwidth can be used with millimeter-wave band, in comparison with the microwave band. However, propagation loss in free space increases proportionately to the frequency. Accordingly, there is a problem with millimeter-wave band communication in that the transmission distance is short, and communication can only be performed in limited areas.

A technique is being proposed in which RoF (radio on fiber) is used to separate a signal processing unit and an antenna unit of an AP (access point), and the antenna unit is situated as a remote station, thereby expanding the perceived area that is covered, as a technique to solve this problem. In this technique, connecting a plurality of antenna units to a single signal processing unit and situating a plurality of remote stations enables further expansion of the area that is covered, as illustrated in FIG. 10. In FIG. 10, M (where M is an integer of 2 or greater) remote stations are written as remote station #1 through remote station #M, respectively. Separating the signal processing unit and the antenna unit also enables the configuration of the remote station to be simplified, and electric power consumption to be conserved. Further, consolidating control of the plurality of remote stations in one signal processing unit (P2MP; point to multi point) is expected to yield advantages cost-wise.

Combination with PON (passive optical network) technology is being studied as a technique to connect a plurality of antenna units to a single signal processing unit. In order to realize RoF using PON, there is a need to have the plurality of antenna units to communicate with a plurality of STAs (station; wireless stations) without interference (collision). N (where N is an integer of 1 or greater) STAs are also written as STAs #1 through #N.

In a system using RoF, the transmission distance is longer as compared with normal wireless systems, and accordingly collision avoidance technology that takes into consideration propagation delay occurring by long-distance transmission is necessary. For example, collision avoidance technology in a system using RoF is being studied, in which can be seen with reference to NPL 1. However, NPL 1 only shows evaluation of a case where one antenna unit is connected to one signal processing unit. In a case where a plurality of antenna units is connected to a single signal processing unit by combining RoF and PON, there may be deviation in timing for the network allocation vector (NAV; network allocation vector) at each STA when the STAs are situated away from each other. There is a possibility that the NAV period at another STA will end before communication ends, due to this deviation, and collision of signals will occur.

Accordingly, attention is given to the TDM (time division multiplexing) method. Applying the TDM method enables the problem of interference to be solved while maintaining the advantage of simplification of configuration and so forth. In the TDM method, communication is performed in accordance with predetermined time intervals called time slots, as illustrated in FIG. 11. TDM communication is carried out between the AP and the STAs without performing time synchronization. First, an AP transmits a beacon (Beacon) to all STAs that are connected. Each STA receives the beacon at a time that is later than the time of transmission at the AP by an amount of time equivalent to a delay time corresponding to the transmission distance from the AP to the own station. The STAs that have received the beacon each return transmission requests.

After receiving the transmission requests from all STAs, the AP transmits, to each STA, a slot allocation notification indicating a time slot that has been allocated to each STA. In FIG. 11, a time slot Slot 1 is allocated to STA #1, and a time slot Slot N is allocated to STA #N. The STAs perform data transmission following the allocation notified thereto.

The time slot for data transmission is started after a certain amount of time after receiving the slot allocation notification. Accordingly, data transmission from the STAs is started delayed by a delay time amount corresponding to the transmission distance from the STAs to the AP. Also, the AP receives the data transmitted from the STAs, but this data arrives delayed in accordance with the transmission distance. That is to say, the timing of the AP receiving the data from the STA is delayed by the delay time amounts of each STA from the start of data transmission. Accordingly, delay that is twice the delay time amount of each STA occurs until reception of data at the AP is completed. In the TDM method, a GT (guard time) is generally used to avoid data interference due to delay. The GT is set to be able to compensate for expected delay, and accordingly in this case, twice or more the time of the delay occurring at the STA that is the farthest from the AP (delay time occurring when making one round trip between the farthest STA and the AP) needs to be set as the GT. The GT is a non-communication period, and accordingly a long GT causes deterioration in transmission efficiency.

The TDM method is also applied to existing PON systems as well (e.g., NPL 2). In a PON system, an OLT (optical line terminal) measures the frame round trip time (RTT; round trip time) between itself and all ONUs (optical network unit) connected thereto. The OLT instructs the ONUs of a transmission start time and transmission amount, on the basis of the measured RTT, so that the ONU signals do not collide.

CITATION LIST

Non Patent Literature

[NPL 1] Okamoto Yusei, Sangenya Yuki, Morimura Masahiro, Yamamoto Koji, Nuno Fusao, Sugiyama Takatoshi, "Throughput improvement of Wireless LAN system with RoF employing AP control", The Institute of Electronics, Information and Communication Engineers, IEICE Technical Report, vol. 112, no. 443, RCS2012-300, p. 97-102, February 2013

[NPL 2] IEEE Standards 802.3ah, September 2004

SUMMARY OF THE INVENTION

Technical Problem

As described above, in a case of applying the TDM method to an RoF system, a long GT is necessary to avoid interference due to transmission delay, and transmission efficiency deteriorates. Also, in a case of performing allocation taking RTT into consideration in an RoF system in the same way as in a PON system, the AP measures the RTT in order for each STA. Accordingly, the time for RTT measurement is overhead, and transmission efficiency deteriorates as the number of STAs increases.

In light of the above situation, it is an object of the present invention to provide a TDM-method wireless communication system, access point device, wireless station device, and wireless communication method, that can improve transmission efficiency.

Means for Solving the Problem

An aspect of the present invention is a wireless communication system including an access point device and a plurality of wireless station devices that wirelessly communicates with the access point device. The access point device includes a first time acquisition unit that acquires time information from an external device, and synchronizes time with the wireless station devices, a transmission start time acquisition unit that acquires a transmission start time of a first signal on the basis of the synchronized time, a first signal transmission unit that transmits the first signal to the wireless station devices at the transmission start time, a second signal reception unit that receives a second signal from the wireless station devices in accordance with the first signal, delay time acquisition processing that performs one of processing of acquiring, from the second signal, delay time calculated from a difference between the transmission start time notified by the first signal and a reception start time of the first signal at the wireless station devices, and processing of acquiring the reception start time of the first signal at the wireless station devices from the second signal, and calculating the delay time from a difference between the transmission start time and the reception start time, a scheduling unit that decides a timing for permitting transmission by time division to each of the wireless station devices on the basis of the delay time of the wireless station devices, and a notification unit that notifies the wireless station devices of the timing that the scheduling unit has decided. The wireless station devices include a second time acquisition unit that acquires time information from an external device, and synchronizes time with the access point device, a first signal reception unit that receives the first signal from the access point device, a reception start time acquisition unit that acquires a reception start time of the first signal on the basis of the time information that the second time acquisition unit has acquired, a second signal transmission unit that transmits, to the access point device, the second signal in which the reception start time is set, or the second signal in which the delay time calculated from a difference between the transmission start time acquired from the first signal and the reception start time is set, and a control unit that effects control to start transmission of a signal to the access point device at the timing notified from the access point device.

An aspect of the present invention is the above-described wireless communication system, in which the control unit effects control to start transmission of a signal to the access point device at a timing earlier than the notified timing by an amount equivalent to the delay time at the wireless station devices.

An aspect of the present invention is the above-described wireless communication system, in which the scheduling unit allocates time slots permitting the wireless station devices to each transmit by time division, where the wireless station devices are permitted to transmit at a timing that is a timing earlier than the start of the time slots allocated to the wireless station devices by an amount of time equivalent to the delay time at the wireless station devices.

An aspect of the present invention is an access point device in a wireless communication system including the access point device and a plurality of wireless station devices that wirelessly communicates with the access point device. The access point device includes a time acquisition unit that acquires time information from an external device, and synchronizes time with the wireless station devices, a transmission start time acquisition unit that acquires a transmission start time of a first signal on the basis of the synchronized time, a first signal transmission unit that transmits the first signal to the wireless station devices at the transmission start time, a second signal reception unit that receives a second signal from the wireless station devices in accordance with the first signal, delay time acquisition processing that performs one of processing of acquiring, from the second signal, delay time calculated from a difference between the transmission start time notified by the first signal and a reception start time of the first signal at the wireless station devices, and processing of acquiring the reception start time of the first signal at the wireless station devices from the second signal, and calculating the delay time from a difference between the transmission start time and the reception start time, a scheduling unit that decides a timing for permitting transmission by time division to each of the wireless station devices on the basis of the delay time of the wireless station devices, and a notification unit that notifies the wireless station devices of the timing that the scheduling unit has decided.

An aspect of the present invention is a wireless station device in a wireless communication system including an access point device and a plurality of the wireless station device that wirelessly communicates with the access point device. The wireless station device includes a time acquisition unit that acquires time information from an external device, and synchronizes time with the access point device, a first signal reception unit that receives a first signal from the access point device, a reception start time acquisition unit that acquires a reception start time of the first signal on the basis of the time information that the time acquisition unit has acquired, a second signal transmission unit that performs one of processing of transmitting, to the access point device, a second signal in which the reception start time is set, and processing of acquiring a transmission start time of the first signal at the access point device from the first signal, and transmitting, to the access point device, the second signal in which a delay time calculated from a difference between the acquired transmission start time and the reception start time is set, and a control unit that effects control to receive, from the access point device, notification of a timing at which transmission by time division is permitted, decided on the basis of a delay time calculated from a difference between the transmission start time and the reception start time notified by the second signal, or the delay time notified by the second signal, and to start transmission of a signal to the access point device at the notified timing.

An aspect of the present invention is a wireless communication method in a wireless communication system that includes an access point device and a plurality of wireless station devices that wirelessly communicates with the access point device. The method includes the steps executed by the access point device, including a first time information acquisition step of acquiring time information from an external device, and synchronizing time with the wireless station devices, a transmission start time acquisition step of acquiring a transmission start time of a first signal on the basis of the synchronized time, a first signal transmission step of transmitting the first signal to the wireless station devices at the transmission start time, a second signal reception step of receiving a second signal from the wireless station devices in accordance with the first signal, a delay time acquisition step of performing one of processing of acquiring, from the second signal, delay time calculated from a difference between the transmission start time notified by the first signal and a reception start time of the first signal at the wireless station devices, and processing of acquiring the reception start time of the first signal at the wireless station devices from the second signal, and calculating the delay time from a difference between the transmission start time and the reception start time, a scheduling step of deciding a timing for permitting transmission by time division to each of the wireless station devices on the basis of the delay time of the wireless station devices, and a notification step of notifying the wireless station devices of the timing decided in the scheduling step, and the steps executed by the wireless station devices including a second time acquisition step of acquiring time information from an external device, and synchronizes time with the access point device, a first signal reception step of receiving the first signal from the access point device, a reception start time acquisition step of acquiring a reception start time of the first signal on the basis of the time information acquired in the second time acquisition step, a second signal transmission step of transmitting, to the access point device, the second signal in which the reception start time is set, or the second signal in which the delay time calculated from a difference between the transmission start time acquired from the first signal and the reception start time is set, and a control step of effecting control to start transmission of a signal to the access point device at the timing notified from the access point device.

Effects of the Invention

According to the present invention, transmission efficiency can be improved.

DESCRIPTION OF EMBODIMENTS

Embodiments of the present invention will be described below in detail with reference to the figures.

First Embodiment

Figure 1:
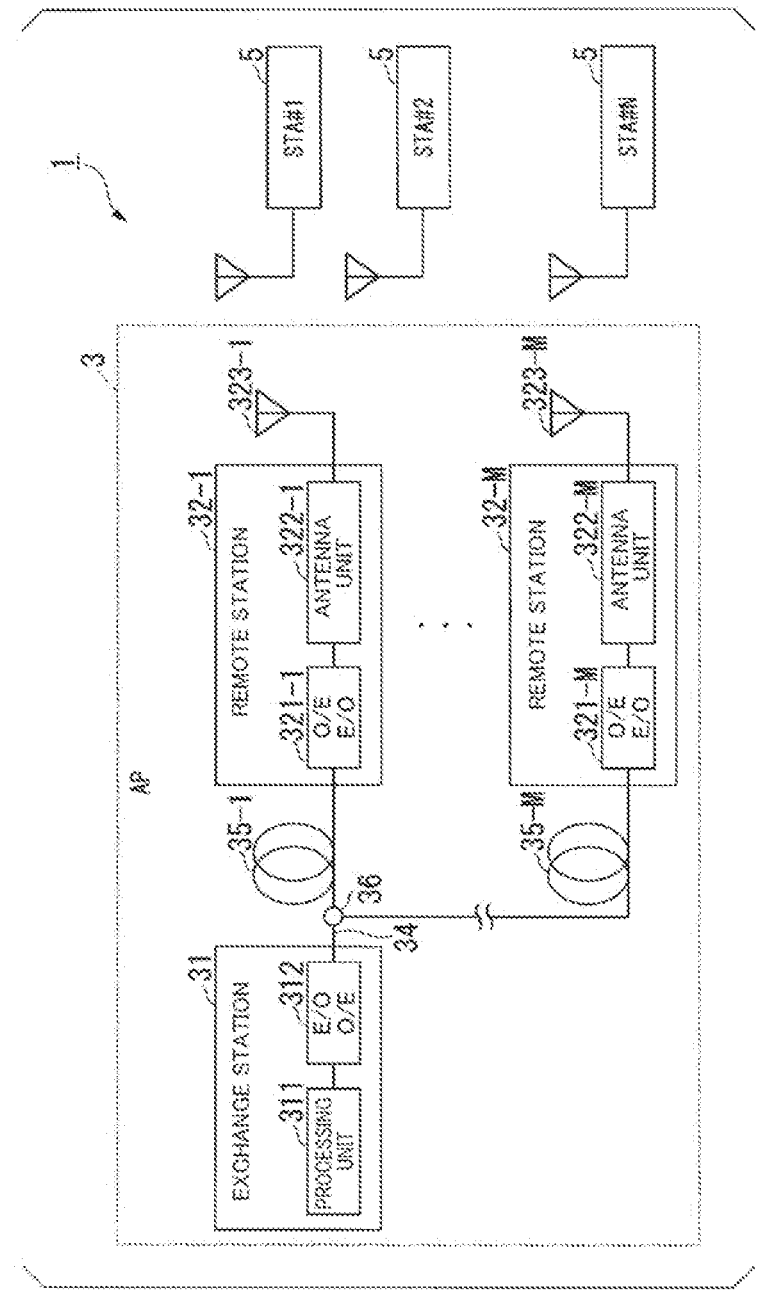
FIG. 1 is a diagram illustrating a configuration example of an optical wireless communication system according to a first embodiment of the present invention.

FIG. 1 is a diagram illustrating an optical wireless communication system 1 according to a first embodiment of the present invention. The optical wireless communication system 1 is provided with an AP (access point) 3, and N (where N is an integer of 1 or greater) STAs (wireless stations) 5. With the index of each of the N STAs 5 as i (where i is an integer of 1 or greater and not more than N), a STA 5 with the index i will be written as STA The optical wireless communication system 1 externally acquires time for time synchronization, and performs communication control on the basis of the acquired time. That is to say, the AP 3 and all STAs 5 connected to the AP 3, which make up the optical wireless communication system 1, externally acquire information of time (hereinafter referred to as "absolute time"), perform time synchronization using the acquired absolute time, and control communication timing on the basis of the absolute time. Thus, the GT due to longer transmission distances can be reduced. Reduction in the GT enables the transmission efficiency of the RoF system with the TDM method applied to be improved.

The AP 3 is provided with an exchange station 31 separated by applying RoF (radio on fiber), and M (where M is an integer of 1 or greater) remote stations 32. The M remote stations 32 are each written as remote stations 32-1 through 32-M. The exchange station 31 and the remote stations 32 are in a one-to-many relation, and are connected using optical fibers 34 and 35-1 through 35-M, and a splitter 36. The exchange station 31 is connected to the optical fiber 34, and a remote station 32-$m$ (where m is an integer of 1 or greater and not more than M, hereinafter the same) is connected to an optical fiber 35-$m$. The splitter 36 distributes optical signals transmitted over the optical fiber 34 to the optical fibers 35-1 through 35-M. The splitter 36 also performs time division multiplexing of optical signals transmitted over the optical fibers 35-1 through 35-M and outputs the optical signals to the optical fiber 34.

The exchange station 31 is provided with a processing unit 311 and an E/O (electrical/optical) and O/E (optical/electrical) conversion unit 312. The processing unit 311 performs transmission/reception processing of signals, and allocation of time slots, which permit communication, to the STAs 5. The E/O and O/E conversion unit 312 converts transmission signals output by the processing unit 311 from electrical signals to optical signals, and outputs the converted signals to the optical fiber 34. The E/O and O/E conversion unit 312 also receives optical signals transmitted from the remote stations 32-1 through 32-M from the optical fiber 34, converts the received optical signals into electrical signals, and outputs the converted signals to the processing unit 311.

The remote station 32 is provided with an O/E and E/O conversion unit 321, an antenna unit 322, and an antenna element 323. The O/E and E/O conversion unit 321, the antenna unit 322, and the antenna element 323 that a remote station 32-$m$ is provided with will be referred to as O/E and E/O conversion unit 321-$m$, antenna unit 322-$m$, and antenna element 323-$m$, respectively. The O/E and E/O conversion unit 321-$m$ receives, from the optical fiber 35-$m$, optical signals transmitted from the exchange station 31, converts the received optical signals into electrical signals, and outputs the converted signals to the antenna unit 322-$m$. The O/E and E/O conversion unit 321-$m$ also converts electrical signals received from the antenna unit 322-$m$ into optical signals and outputs the converted signals to the optical fiber 35-$m$. The antenna unit 322-$m$ radiates the electrical signals that the O/E and E/O conversion unit 321 outputs from the antenna element 323-$m$ as wireless signals. The antenna unit 322-$m$ also outputs wireless signals received by the antenna element 323-$m$ to the O/E and E/O conversion unit 321-$m$ as electrical signals.

Figure 2:
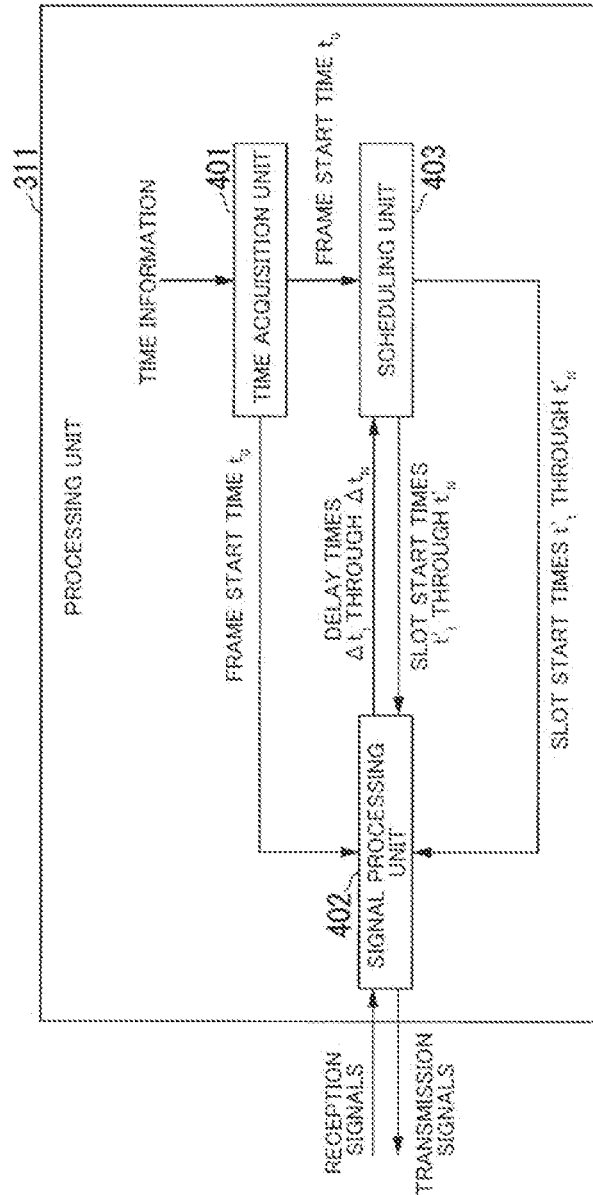
FIG. 2 is a block diagram illustrating a detailed configuration of a processing unit according to the first embodiment.

FIG. 2 is a block diagram illustrating a detailed configuration of the processing unit 311 of the AP 3. The processing unit 311 is provided with a time acquisition unit 401, a signal processing unit 402, and a scheduling unit 403.

The time acquisition unit 401 externally acquires time information indicating absolute time. The time acquisition unit 401 acquires time information from, for example, the Global Positioning System (GPS), or TOD (time of day). Note that the time acquisition unit 401 may acquire time information from any other system from which the time can be acquired. Alternatively, the AP 3 and the STAs 5 may each be provided with a high-precision clock such as an atomic clock, and may acquire time information therefrom.

The signal processing unit 402 generates transmission signals to be transmitted to the STAs 5, and outputs the signals to the E/O and O/E conversion unit 312. The signal processing unit 402 also inputs reception signals from the E/O and O/E conversion unit 312 and performs reception processing. The signal processing unit 402 generates a beacon, in which a frame start time $t_0$ acquired on the basis of the absolute time is set, and performs output to the E/O and O/E conversion unit 312 at the frame start time $t_0$. The signal processing unit 402 also receives transmission requests that the STAs 5 #1 through #N transmit in accordance with the beacon, and outputs delay times $\Delta t_1$ through $\Delta t_N$ acquired from each of the received transmission requests to the scheduling unit 403. A delay time $\Delta t_i$ (where i is an integer of 1 or greater and not more than N) is time from the frame start time $t_0$ to a reception start time of the frame of the beacon at the STA #i. The signal processing unit 402 also generates slot allocations for notification of slot start times $t'_1$ through $t'_N$ of the respective STAs 5 #1 through #N, and outputs the slot allocations to the E/O and O/E conversion unit 312. The signal processing unit 402 receives signals from the STAs 5 #1 through #N following the slot start times $t'_1$ through $t'_N$.

The scheduling unit 403 allocates slots to the STAs 5 #1 through #N, on the basis of the delay times $\Delta t_1$ through $\Delta t_N$ of the STAs 5 #1 through #N acquired by the signal processing unit 402. The scheduling unit 403 outputs the slot start times $t'_1$ through $t'_N$ of the slots allocated to the STAs 5 #1 through #N to the signal processing unit 402.

Figure 3:
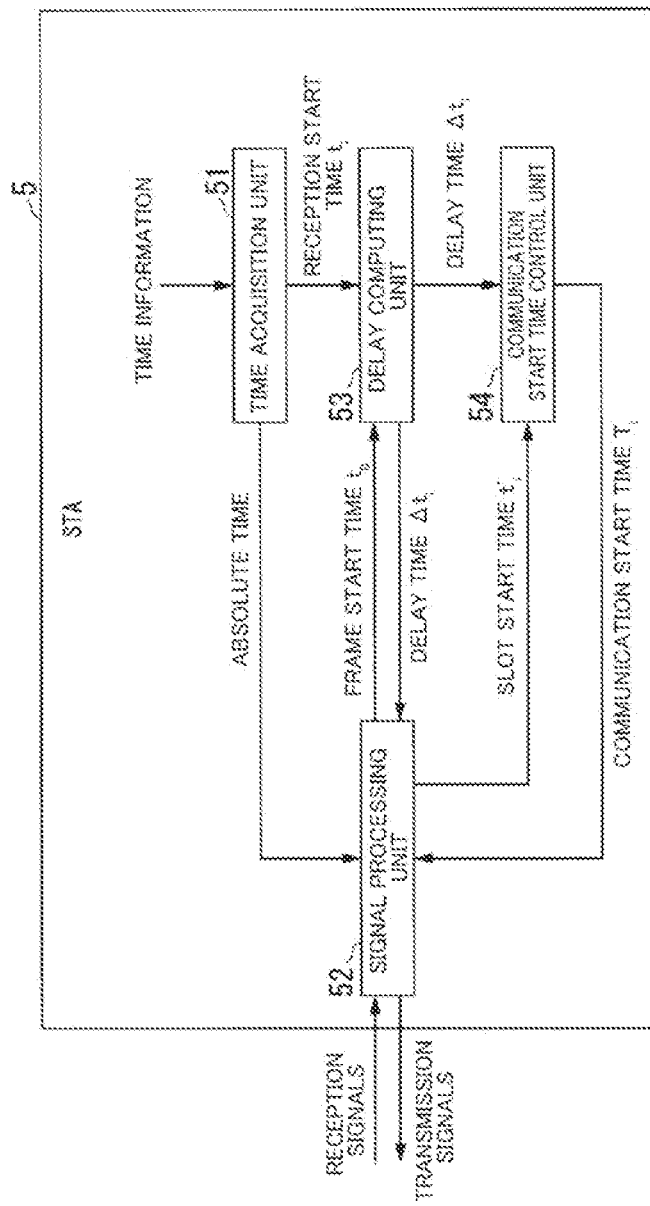
FIG. 3 is a block diagram illustrating a detailed configuration of a STA according to the first embodiment.

FIG. 3 is a block diagram illustrating the configuration of the STA 5. The STA 5 is provided with a time acquisition unit 51, a signal processing unit 52, a delay computing unit 53, and a communication start time control unit 54. In FIG. 3, the antenna element that the STA 5 is provided with is omitted from illustration. An example will be described here regarding a case where the STA 5 is STA #i (where i is an integer of 1 or greater and not more than N).

The time acquisition unit 51 externally acquires time information indicating the absolute time. The source from which the time information is acquired is preferably the same as that of the time acquisition unit 401 of the AP 3. Thus, the time acquisition unit 51 performs time synchronization with the AP 3.

The signal processing unit 52 performs reception processing with regard to wireless signals received by the antenna element. The signal processing unit 52 also generates transmission signals, and wirelessly transmits the transmission signals from the antenna element. In a case of receiving a beacon from the AP 3, the signal processing unit 52 outputs a frame start time $t_0$ set in the beacon to the delay computing unit 53. The signal processing unit 52 transmits a transmission request, in which a delay time $\Delta t_i$ calculated by the delay computing unit 53 is set, to the AP 3, in response to reception of the beacon. The signal processing unit 52 receives a slot allocation from the AP 3 in accordance with the transmission request, and outputs a slot start time $t'_i$ for the own station that is set in the slot allocation to the communication start time control unit 54.

The signal processing unit 52 transmits data signals at a communication start time $T_i$, following control of the communication start time control unit 54.

The delay computing unit 53 calculates the delay time $\Delta t_i$ from the difference between the frame start time $t_0$ set in the beacon, and the own-station reception start time $t_i$ of the frame of the beacon that is obtained from the time information received by the time acquisition unit 51. The communication start time control unit 54 uses the slot start time $t'_i$ of the own station set in the slot allocation to decide the communication start time $T_i$ for the own station. The communication start time control unit 54 controls the signal processing unit 52 to transmit data at the communication start time $T_i$ that is decided.

Next, the flow of processing of the optical wireless communication system 1 will be described.

Figure 4:
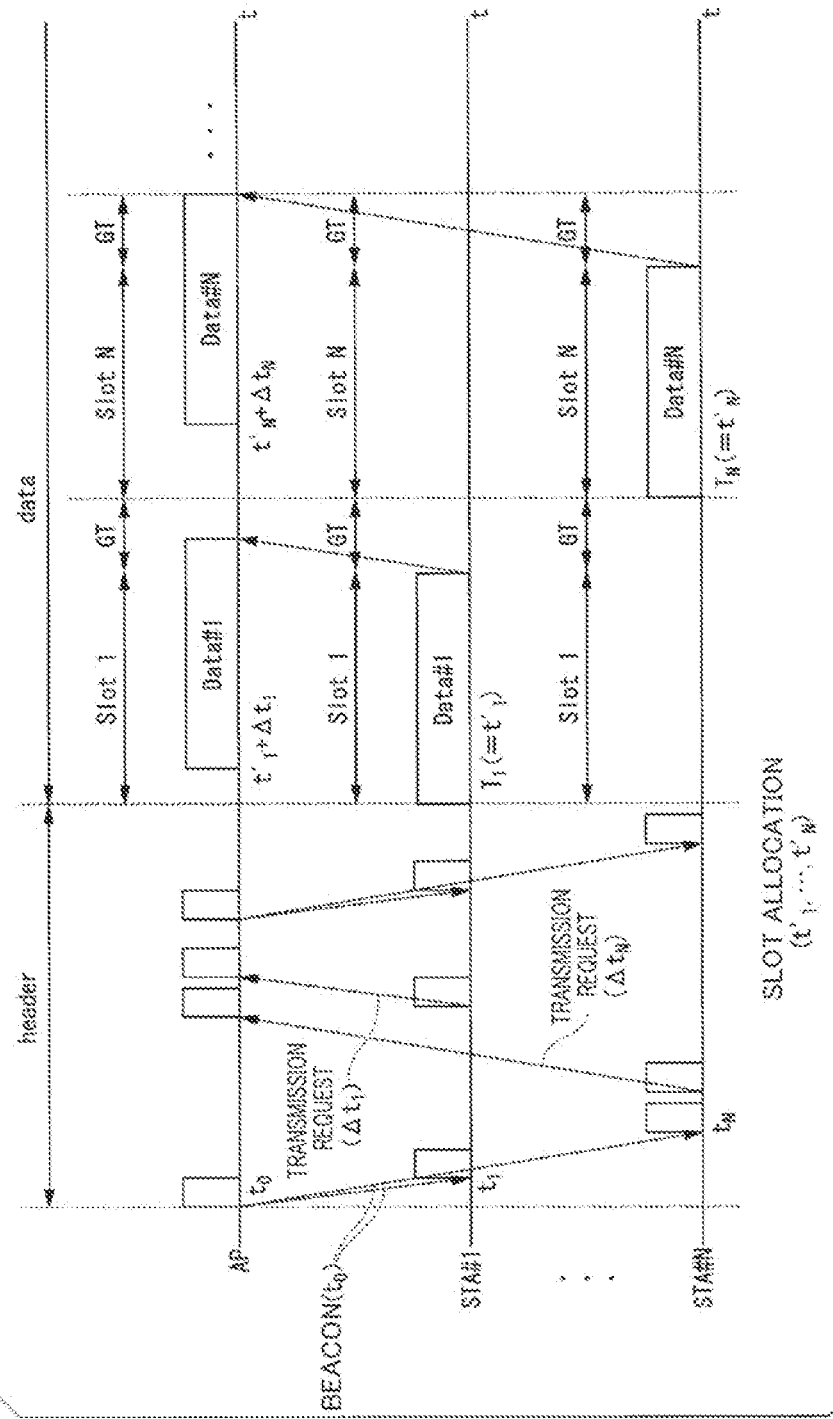
FIG. 4 is a diagram illustrating RoF system communication procedures according to the first embodiment.

FIG. 4 is a sequence diagram illustrating an example of processing procedures of the optical wireless communication system 1 according to an embodiment of the present invention. First, the AP 3 transmits a beacon to all STAs #1 through #N. Specifically, the signal processing unit 402 of the AP 3 acquires the frame start time $t_0$ of the frame (a combination of a header and data) of the beacon, on the basis of the absolute time acquired by the time acquisition unit 401. The AP 3 generates the beacon with the frame start time $t_0$ added thereto, and outputs the beacon at the frame start time $t_0$. The E/O and O/E conversion unit 312 converts the beacon input from the signal processing unit 402 into optical signals, and outputs the optical signals to the remote stations 32-1 through 32-M. The remote stations 32-1 through 32-M wirelessly transmit the beacon received by the optical signals to all STAs #1 through #N.

At the same time of the signal processing unit 52 of each STA #i (where i is an integer of 1 or greater and not more than N) receiving the beacon, the time acquisition unit 51 acquires the reception start time $t_i$ of the beacon. The signal processing unit 52 outputs the frame start time $t_0$ set in the beacon to the delay computing unit 53. The delay computing unit 53 calculates the delay time $\Delta t_i$ on the basis of the following Formula (1), using the frame start time $t_0$ and the reception start time $t_i$.

$$\Delta t_i = t_i - t_0 \quad (1)$$

The signal processing unit 52 of each STA #i adds the delay time $\Delta t_i$ calculated by the delay computing unit 53 to the transmission request, and notifies the AP 3 thereof.

The remote stations 32-1 through 32-M of the AP 3 convert the transmission requests received from the STAs #1 through #N into optical signals and output the optical signals to the exchange station 31. The E/O and O/E conversion unit 312 of the exchange station 31 outputs the transmission requests converted from optical signals into electrical signals to the processing unit 311. The signal processing unit 402 of the processing unit 311 outputs the delay time $\Delta t_i$ acquired from the transmission request of each STA #i to the scheduling unit 403. The scheduling unit 403 performs allocation (scheduling) of time slots for each of the STAs #i on the basis of the delay time $\Delta t_i$ of each STA #i. A GT is provided between the time slots. The scheduling unit 403 can efficiently allocate time slots here by performing allocation such that the longer the delay time of the STA 5 is, the later the time slot is that is allocated thereto.

The scheduling unit 403 notifies the signal processing unit 402 of the slot start time $t'_i$ according to absolute time, for the time slots allocated to each of the STAs #i. The signal processing unit 402 generates slot allocations, in which are set the slot start times $t'_i$ allocated to the STAs #i.

The E/O and O/E conversion unit 312 converts the slot allocations generated by the signal processing unit 402 into optical signals, and outputs the optical signals to the remote stations 32-1 through 32-M. The remote stations 32-1 through 32-M wirelessly transmit the slot allocations received by optical signals to all STAs #1 through #N.

Upon receiving the slot allocation, the signal processing unit 52 of each STA #i (where i is an integer of 1 or greater and not more than N) outputs a slot start time $t'_i$ of the own station that is set in the slot allocation to the communication start time control unit 54. The communication start time control unit 54 uses the slot start time $t'_i$ that is notified thereto to decide the communication start time $T_i$ on the basis of the following Formula (2).

$$T_i = t'_i \quad (2).$$

The communication start time control unit 54 controls the signal processing unit 52 to perform data transmission following the communication start time $T_i$ that is obtained. The signal processing unit 52 wirelessly transmits data signals to the AP 3 at the communication start time $T_i$. In FIG. 4, the STA #1 transmits a data signal Data #1 at the communication start time $T_1$ of Slot 1, and the STA #N transmits a data signal Data #N at the communication start time $T_N$ of Slot N.

The AP 3 receives the data signal Data #1 at a timing where the delay time $\Delta t_1$ has elapsed from the slot start time $t'_1$ of slot 1, and receives the data signal Data #N at a timing where the delay time $\Delta t_N$ has elapsed from the slot start time $t'_N$ of Slot N.

As described above, the AP 3 receives signals from each of the STAs #i delayed by the delay time $\Delta t_i$ in accordance with the transmission distance between the AP 3 and the STAs #i. Accordingly, the timing at which reception of data signals from each of the STAs #i is completed by the AP 3 is a time delayed by $\Delta t_i$ from the end of the time slots allocated to the STAs #i. With the STAs 5 at the farthest distance from the AP 3 as STA #N, the greatest delay time expected is $\Delta t_N$. Accordingly, the optical wireless communication system 1 can reduce the GT from the conventionally-necessary $\Delta t_N \times 2$ to $\Delta t_N$, and accordingly can improve transmission efficiency.

Figure 5:
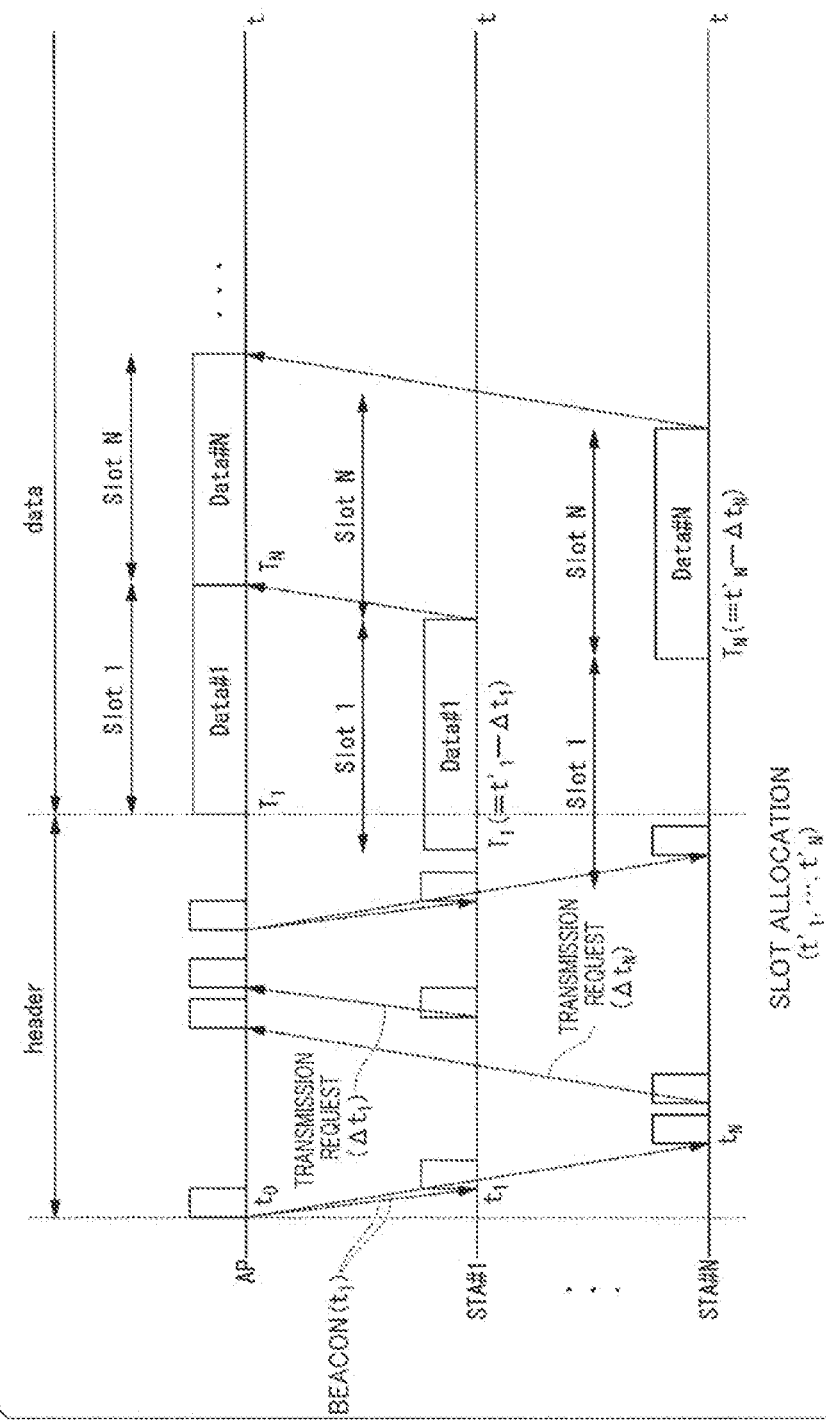
FIG. 5 is a diagram illustrating RoF system communication procedures according to the first embodiment.

FIG. 5 is a sequence diagram illustrating another example of processing procedures of the optical wireless communication system 1. As illustrated in FIG. 5, the STAs 5 may start data transmission before the slot start time of the allocated time slot, taking into consideration the transmission delay when transmitting data. That is to say, each STA 5 expedites the start timing of the data transmission interval thereof by an amount of time equivalent to the transmission delay of that STA 5. In this case, the communication start time control unit 54 of each STA #i calculates the communication start time $T_i$ on the basis of the following Formula (3), using the delay time $\Delta t_i$ calculated by the delay computing unit 53, and the slot start time $t'_i$ notified by the AP 3.

$$T_i = t'_i - \Delta t_i \quad (3)$$

By each STA #i setting the communication start time $T_i$ at a timing where the slot start time $t'_i$ is expedited by an amount of time equivalent to the transmission delay (delay time $\Delta t_i$), the AP 3 is perceived as receiving the data signals #1 through #N without delay. Accordingly, the GT for compensating for transmission delay becomes unnecessary, and further improvement in transmission efficiency can be achieved. Note that a GT smaller than that in FIG. 4 may be provided between time slots.

The time slots of the STAs 5 temporally overlap those of other STAs 5 as illustrated in FIG. 5, but interference on the optical fiber 34 can be avoided by transmitting data in order from the STAs 5 with short delay time.

According to the embodiment described above, the GT that is necessary due to longer transmission distances using RoF is reduced, and transmission efficiency is improved.

Second Embodiment

In the first embodiment, each STA #i calculates the delay time $\Delta t_i$. In the present embodiment, the AP 3 calculates the delay time $\Delta t_i$ of each STA #i. Description will be made below primarily regarding differences as to the first embodiment.

Figure 6:
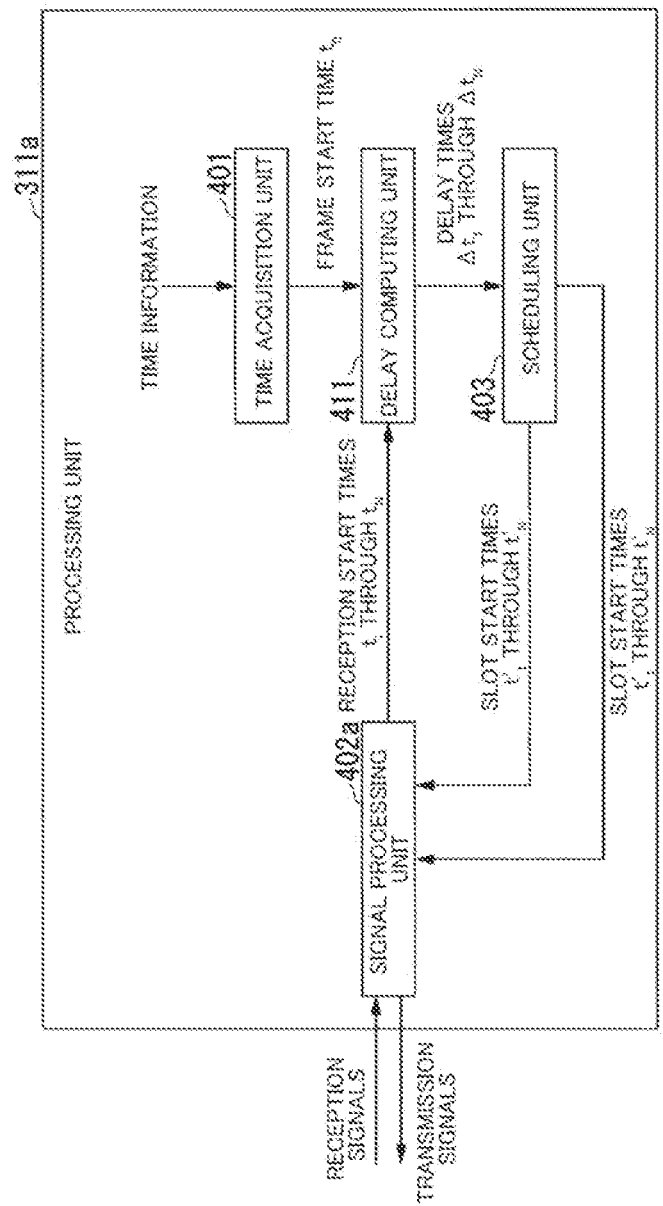
FIG. 6 is a block diagram illustrating a detailed configuration of a processing unit according to a second embodiment.

The AP 3 according to the present embodiment is provided with a processing unit 311a illustrated in FIG. 6, instead of the processing unit 311.

FIG. 6 is a diagram illustrating a configuration of the processing unit 311a according to the embodiment. In FIG. 6, parts that are the same as those in the processing unit 311 according to the first embodiment illustrated in FIG. 2 are denoted by the same numerals, and description thereof will be omitted. The processing unit 311a illustrated in FIG. 6 differs from the processing unit 311 in FIG. 2 with regard to the point of being provided with a signal processing unit 402a instead of the signal processing unit 402, and the point of being further provided with a delay computing unit 411.

The signal processing unit 402a outputs the reception start times $t_1$ through $t_N$ acquired from the transmission requests from each of the STA #1 through STA #N to the delay computing unit 411. The delay computing unit 411 calculates the delay time $\Delta t_i$ for each STA #i by Formula (1). The delay computing unit 411 notifies the scheduling unit 403 of the delay times $\Delta t_1$ through $\Delta t_N$ calculated for the respective STA #1 through STA #N.

Figure 7:
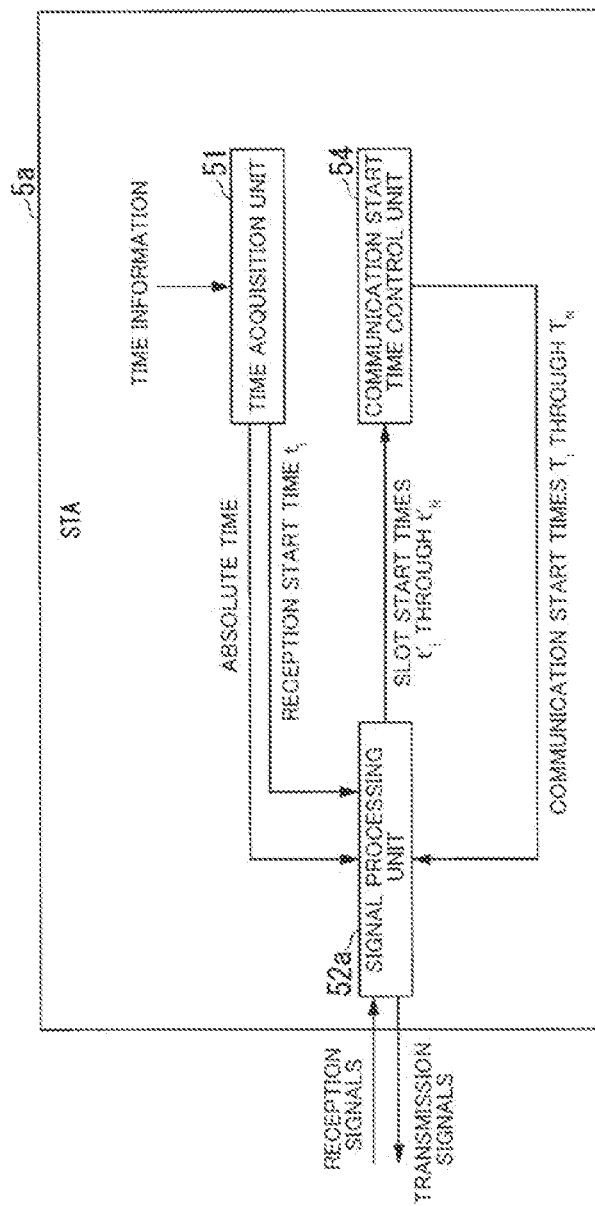
FIG. 7 is a block diagram illustrating a detailed configuration of a STA according to the second embodiment.

The optical wireless communication system according to the present embodiment also is provided with STAs 5a having the configuration illustrated in FIG. 7 instead of the STA 5 illustrated in FIG. 3. FIG. 7 is a block diagram illustrating the configuration of the STA 5a according to the present embodiment. In FIG. 7, parts that are the same as those in the STA 5 according to the first embodiment illustrated in FIG. 3 are denoted by the same numerals, and description thereof will be omitted. The STA 5a in FIG. 7 differs from the STA 5 according to the first embodiment illustrated in FIG. 3 with regard to the point of being provided with a signal processing unit 52a instead of the signal processing unit 52, and the point of not being provided with the delay computing unit 53. The signal processing unit 52a transmits a transmission request, in which the reception start time $t_i$ of the beacon frame is set, to the AP 3.

Processing procedures of the optical wireless communication system according to the present embodiment will be described with reference to FIG. 4, FIG. 6, and FIG. 7.

First, the AP 3 transmits a beacon to all STAs #1 through #N, in the same way as in the first embodiment. At this time, the time acquisition unit 401 acquires the frame start time $t_0$ of the beacon, but the signal processing unit 402a does not have to set the frame start time $t_0$ in the beacon.

At the same time of the signal processing unit 52a of each STA #i (where i is an integer of 1 or greater and not more than N) receiving the beacon, the time acquisition unit 51 acquires the reception start time $t_i$ of the beacon. The signal processing unit 52a notifies the AP 3 of the transmission request in which the reception start time $t_i$ is set. The signal processing unit 402a of the AP 3 outputs the reception start times $t_i$, acquired from the transmission requests of the STAs #i, to the delay computing unit 411. The delay computing unit 411 calculates the delay time $t_i$ of each STA #i on the basis of Formula (1), using the frame start time $t_0$ and the reception start time $t_i$. The scheduling unit 403 performs allocation (scheduling) of time slots for each of the STAs #i on the basis of the delay time $\Delta t_i$ of each STA #i. The scheduling unit 403 can efficiently allocate time slots by performing allocation such that the longer the delay time of the STA 5 is, the later the time slot is that is allocated thereto is.

The subsequent processing is the same as in the first embodiment. That is to say, The AP 3 wirelessly transmits the slot allocations, in which the slot start times $t'_i$ of the time slots allocated to the STAs #i are set, to all the STAs #1 through #N. The STAs #i each decide the communication start time $T_i$ on the basis of Formula (2), using the slot start time $t'_i$ of the own station that is set in the slot allocation. The STAs #1 through #N transmit data to the AP 3 following the communication start time $T_i$ that is obtained. The AP 3 receives the data signals from each STA #i at a timing where the delay time $\Delta t_i$ has elapsed from the slot start time $t'_i$ of the time slot i allocated to the STA #i. With the STA 5a that is at the farthest distance from the AP 3 as STA #N, the greatest expected delay time is $\Delta t_N$. Accordingly, the optical wireless communication system 1 can reduce the GT from the conventionally-necessary $\Delta t_N \times 2$ to $\Delta t_N$, and accordingly can improve transmission efficiency.

Also, the STAs #i may start data transmission before the slot start time of the allocated time slot, taking into consideration the transmission delay when transmitting data, as illustrated in FIG. 5. That is to say, each STA #i expedites the start timing of the communication start time $T_i$ thereof, as to the slot start time $t'_i$ notified from the AP 3, by an amount of time equivalent to the transmission delay (delay time $\Delta t_i$), whereby the AP 3 is perceived as receiving the data signals #1 through #N without delay. Accordingly, the GT for compensating for transmission delay becomes unnecessary, and further improvement in transmission efficiency can be achieved. The time slots of the STAs 5a temporally overlap those of other STAs 5a as illustrated in FIG. 5, but interference on the optical fiber 34 can be avoided by transmitting data in order from the STAs 5a with short delay time.

Third Embodiment

In the first and second embodiments, each of the STAs #i calculates the communication start time $T_i$. In the present embodiment, the AP 3 calculates the communication start time $T_i$ for each of the STAs #i. Description will be made below primarily regarding difference as to the first embodiment, and this difference may be applied to the second embodiment.

Figure 8:
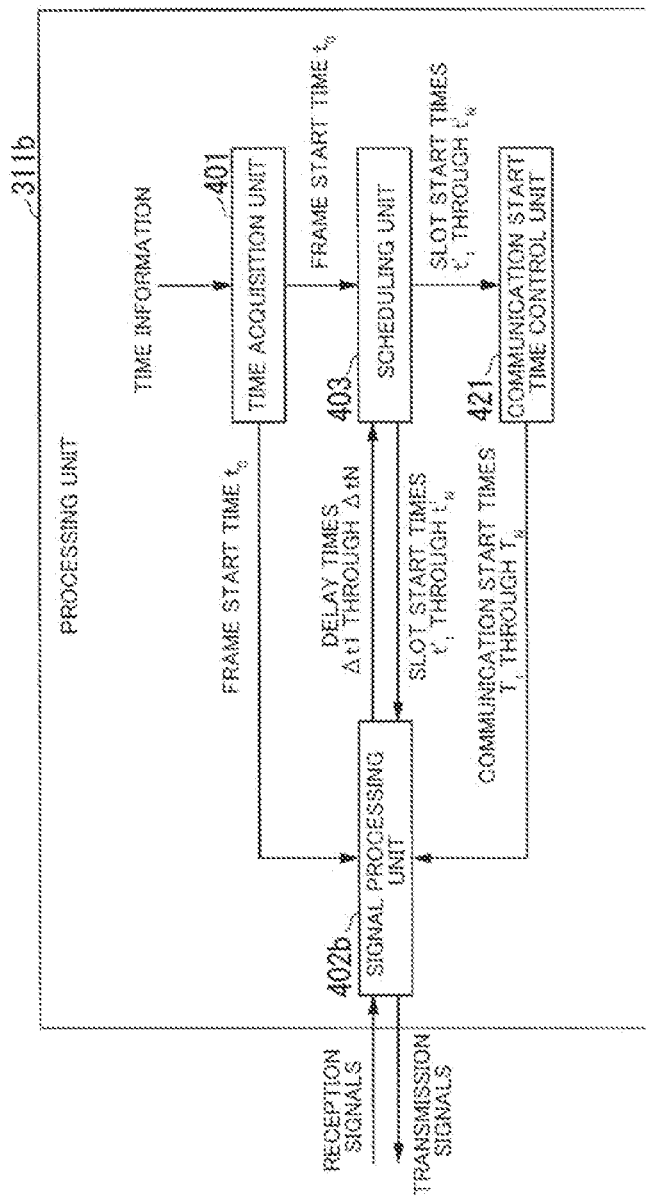
FIG. 8 is a block diagram illustrating a detailed configuration of a processing unit according to a third embodiment.

The AP 3 of the present embodiment is provided with a processing unit 311b illustrated in FIG. 8, instead of the processing unit 311.

FIG. 8 is a diagram illustrating a configuration of the processing unit 311b according to the present embodiment. In FIG. 8, parts that are the same as those in the processing unit 311 according to the first embodiment illustrated in FIG. 2 are denoted by the same numerals, and description thereof will be omitted. The processing unit 311b illustrated in FIG. 8 differs from the processing unit 311 illustrated in FIG. 2 with regard to the point of being provided with a signal processing unit 402b instead of the signal processing unit 402, and the point of being further provided with a communication start time computing unit 421. The signal processing unit 402b transmits the slot allocations in which the communication start times $T_i$ through $T_N$ for the respective STA #1 through STA #N, calculated by the communication start time computing unit 421, are set, to the STA #1 through STA #N. The communication start time computing unit 421 calculates the communication start time $T_i$ for each of the STAs #i by Formula (2) or Formula (3), using the slot start time $t'_i$ of each STA #i (where i is an integer of 1 or greater and not more than N) that the scheduling unit 403 has decided.

Figure 9:
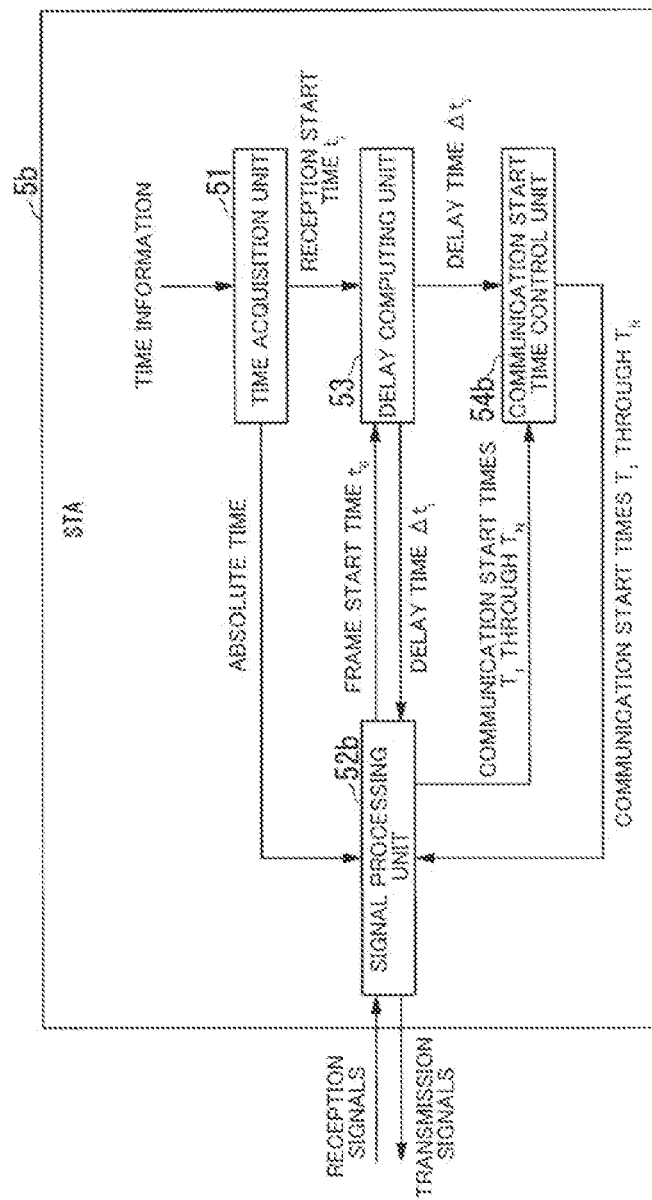
FIG. 9 is a block diagram illustrating a detailed configuration of a STA according to the third embodiment.
Figure 10:
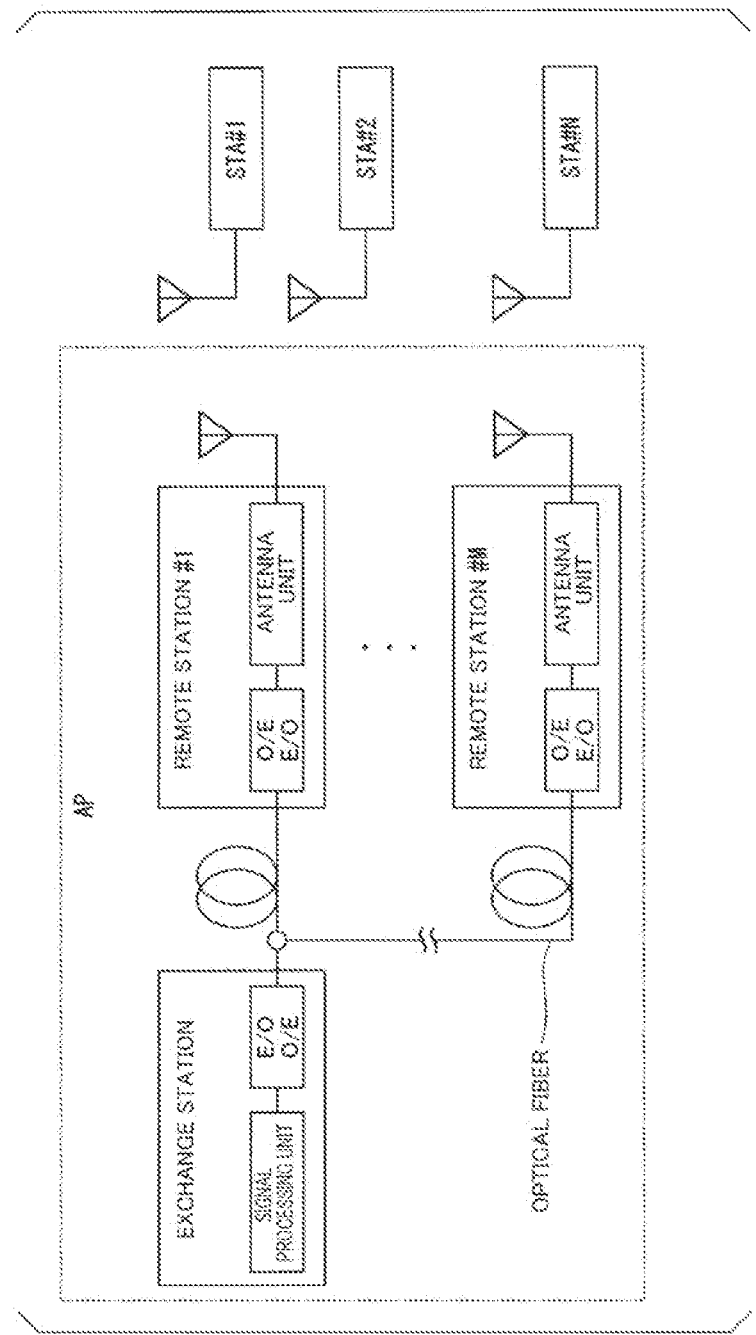
FIG. 10 is a diagram illustrating a configuration example of a conventional RoF system.
Figure 11:
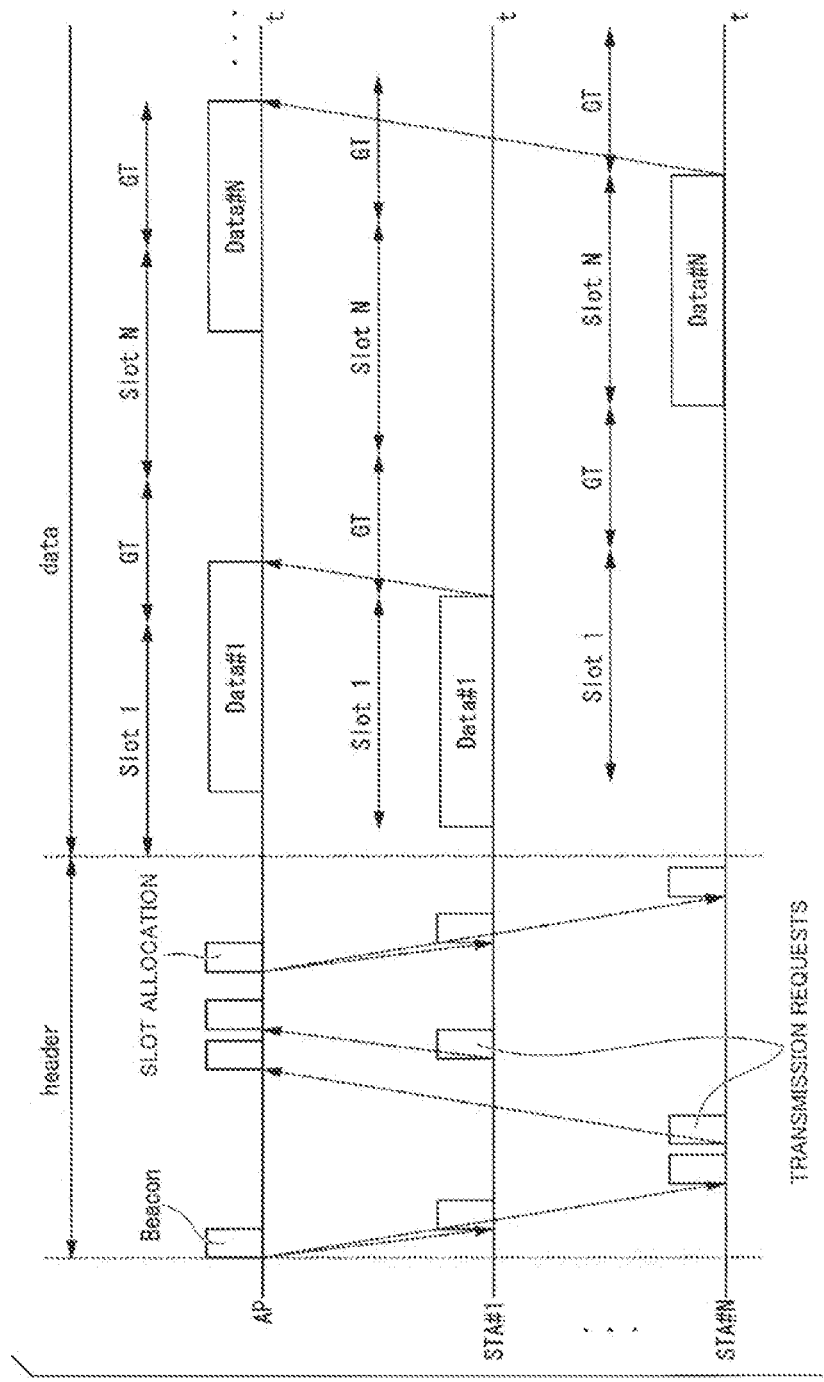
FIG. 11 is a diagram illustrating communication procedures of the conventional RoF system.

The optical wireless communication system according to the present embodiment is provided with STAs 5b having the configuration illustrated in FIG. 9 instead of the STA 5 illustrated in FIG. 3. FIG. 9 is a block diagram illustrating the configuration of the STA 5b according to the present embodiment. In FIG. 9, parts that are the same as those in the STA 5 according to the first embodiment illustrated in FIG. 3 are denoted by the same numerals, and description thereof will be omitted. The STA 5b illustrated in FIG. 9 differs from the STA 5 according to the first embodiment illustrated in FIG. 3 with regard to the point of being provided with a signal processing unit 52b and a communication start time control unit 54b instead of the signal processing unit 52 and the communication start time control unit 54. The signal processing unit 52b outputs the communication start time $T_i$ of the own station that is set in the slot allocation to the communication start time control unit 54b. The communication start time control unit 54b controls the signal processing unit 52b so as to transmit data at the communication start time $T_i$.

In a case of applying the present embodiment to the second embodiment, there is no need for each of the STAs #1 through #N to notify the AP 3 of the delay time. In this case, the AP 3 has the functions of a delay computing unit and the communication start time computing functions of a communication start time control unit, and accordingly the configuration of the STAs can be simplified.

Fourth Embodiment

In the present embodiment, the AP calculates the delay time by using the reception time of a response transmitted from a STA after standing by for a predetermined time following reception of the beacon. Description will be made below primarily regarding difference as to the second embodiment.

The AP 3 transmits a beacon to all STAs #1 through N. The STAs #1 through #N stand by for a fixed time that is decided in advance, from reception of the beacon, and thereafter transmit a response to the AP 3. The delay computing unit 411 of the AP 3 calculates the delay time $\Delta t_i$ on the basis of the frame start time $t_0$ and the time of receiving the response from the STA #i. Thus, in the present embodiment, the AP 3 is provided with the delay computing unit instead of the STAs #1 through #N being provided therewith. There also is no need for the STA #i to notify the AP 3 of the reception start time $t_i$.

Fifth Embodiment

In a case where the STA #i is installed fixedly, the AP 3 or the STA #i calculate the delay time $\Delta t_i$ in advance. The AP 3 or STA #i in the above-described embodiments may use the calculated delay time $\Delta t_i$ fixedly.

Sixth Embodiment

The present embodiment is applicable not only to millimeter-wave RoF, but also to RoF systems that use wireless frequencies other than millimeter-wave.

According to the embodiments described above, in an RoF system to which the TDM method is applied, the AP and all STAs connected to the AP externally acquire absolute time, perform time synchronization using the absolute time, and perform control of communication timing on the basis of the absolute time. Communication timing control using absolute time enables communication to be performed without being affected by transmission delay, and the GT due to longer transmission distances can be reduced as compared with cases where no communication timing control is performed. Accordingly, transmission efficiency can be improved.

Note that the processing units 311, 311*a*, and 311*b* of the AP 3, and the STAs 5, 5*a*, and 5*b* may realize the functions of the above-described embodiments by being provided with a CPU (Central Processing Unit), memory, an auxiliary storage device, and so forth, connected by a bus, and executing a program. Note that all or part of the functions of the processing units 311, 311*a*, and 311*b* of the AP 3, and the STAs 5, 5*a*, and 5*b* may be realized using hardware such as an ASIC (Application Specific Integrated Circuit), a PLD (Programmable Logic Device), an FPGA (Field Programmable Gate Array), or the like.

According to the above-described embodiments, the wireless communication system includes an access point device and a plurality of wireless station devices that wirelessly communicates with the access point device. The wireless communication system is the optical wireless communication system 1, the access point device is the AP 3, and the wireless station devices are the STAs 5, 5*a*, and 5*b*, for example.

The access point device includes a first time acquisition unit, a transmission start time acquisition unit, a first signal transmission unit, a second signal reception unit, delay time acquisition processing, a scheduling unit, and a notification unit. The first time acquisition unit acquires time information from an external device, and synchronizes time with the wireless station devices. The first time acquisition unit is, for example, the time acquisition unit 401. The transmission start time acquisition unit acquires a transmission start time of a first signal on the basis of the synchronized time. The transmission start time acquisition unit is, for example, the time acquisition unit 401. The first signal transmission unit transmits the first signal to the wireless station device at the transmission start time. The second signal reception unit receives a second signal from the wireless station device in accordance with the first signal. The first signal transmission unit and the second signal reception unit are, for example, the signal processing unit 402 and the remote station 32. The delay time acquisition processing acquires, from the second signal, delay time calculated from a difference between the transmission start time notified by the first signal and a reception start time of the first signal at the wireless station devices. Alternatively, the delay time acquisition processing acquires the reception start time of the first signal at the wireless station devices from the second signal, and calculates the delay time from a difference between the transmission start time and the reception start time. The delay time acquisition processing is, for example, the signal processing unit 402 and the delay computing unit 411. The scheduling unit decides a timing for permitting transmission by time division to each of the wireless station devices on the basis of the delay time of the wireless station devices. The notification unit notifies the wireless station devices of the timing that the scheduling unit has decided. The notification unit is, for example, the signal processing unit 402 and the remote station 32.

The wireless station devices include a second time acquisition unit, a first signal reception unit, a reception start time acquisition unit, a second signal transmission unit, and a control unit. The second time acquisition unit acquires time information from an external device, and synchronizes time with the access point device. The second time acquisition unit is, for example, the time acquisition unit 51. The first signal reception unit receives the first signal from the access point device. The first signal reception unit is, for example, the signal processing unit 52. The reception start time acquisition unit acquires a reception start time of the first signal on the basis of the time information that the second time acquisition unit has acquired. The reception start time acquisition unit is, for example, the time acquisition unit 51. The second signal transmission unit transmits, to the access point device, the second signal in which the reception start time is set. Alternatively, the second signal transmission unit transmits, to the access point device, the second signal in which the delay time calculated from a difference between the transmission start time acquired from the first signal and the reception start time is set. The second signal transmission unit is, for example, the signal processing unit 52*a*, or the delay computing unit 53 and the signal processing unit 52. The control unit effects control to start transmission of a signal to the access point device at the timing notified from the access point device. The control unit is, for example, the communication start time control units 54 and 54*b*.

Note that the control unit of the wireless station devices may effect control to start transmission of a signal to the access point device at a timing earlier than the notified timing by an amount equivalent to the delay time at the own devices. Also, the scheduling unit of the access point may allocate time slots permitting the wireless station devices to each transmit by time division, where the wireless station devices are permitted to transmit at a timing that is a timing earlier than the start of the time slots allocated to the wireless station devices by an amount of time equivalent to the delay time at the wireless station devices.

Although embodiments of this invention have been described above in detail with reference to the figures, detailed configurations are not limited to these embodiments, and designs and so forth in a scope not departing from the essence of this invention are also included.

INDUSTRIAL APPLICABILITY

The invention is applicable to a system that performs wireless communication by time division multiplexing.

REFERENCE SIGNS LIST

1 Optical wireless communication system
3 AP
5, 5a, 5b STA
31 Exchange station
32-1 through 32-M Remote station
34, 35-1 through 35-M Optical fiber
36 Splitter
311, 311a Processing unit
51 Time acquisition unit
52, 52a, 52b Signal processing unit
53 Delay computing unit
54, 54b Communication start time control unit
311, 311a, 311b Processing unit
312 E/O and O/E conversion unit
321-1 through 321-M O/E and E/O conversion unit
322-1 through 322-M Antenna unit
401 Time acquisition unit
402, 402a, 402b Signal processing unit
403 Scheduling unit
411 Delay computing unit
421 Communication start time computing unit

The invention claimed is:

1. A wireless communication system, comprising: an access point device; and a plurality of wireless station devices that wirelessly communicates with the access point device,
wherein the access point device includes
a processor; and
a storage medium having computer program instructions stored thereon, when executed by the processor, perform to:
acquires time information from an external device, and synchronizes time with the wireless station devices based on the time information acquired from the external device, acquires a transmission start time of a first signal based on the synchronized time, transmits the first signal to the wireless station devices at the transmission start time, receives a second signal from the wireless station devices in accordance with the first signal, calculates a delay time, decides a timing for permitting transmission by time division to each of the wireless station devices based on the delay time of the wireless station devices, and notifies the wireless station devices of the timing that a scheduling unit has decided, where the delay time is calculated as a difference between the transmission start time from the first signal and a reception start time taken from one of the first signal or the second signal; and
wherein the wireless station devices include
a processor; and
a storage medium having computer program instructions stored thereon, when executed by the processor, perform to:
acquires time information from an external device, and synchronizes time with the access point device, receives the first signal from the access point device, acquires a reception start time of the first signal based on the time information, transmits, to the access point device, the second signal in which the reception start time is set, or the second signal in which the delay time calculated from a difference between the transmission start time acquired from the first signal and the reception start time is set, and effects control to start transmission of a signal to the access point device at the timing notified from the access point device.

2. The wireless communication system according to claim 1, wherein the computer program instructions of the wireless device stations further perform to start transmission of a signal to the access point device at a timing earlier than the notified timing by an amount equivalent to the delay time at the wireless station devices.

3. The wireless communication system according to claim 1, wherein computer program instructions of the access point device further perform to allocates time slots permitting the wireless station devices to each transmit by time division, where the wireless station devices are permitted to transmit at a timing that is a timing earlier than the start of the time slots allocated to the wireless station devices by an amount of time equivalent to the delay time at the wireless station devices.

4. An access point device in a wireless communication system including the access point device and a plurality of wireless station devices that wirelessly communicates with the access point device, the access point device comprising:
a processor; and
a storage medium having computer program instructions stored thereon, when executed by the processor, perform to:
acquires time information from an external device, and synchronizes time with the wireless station devices based on the time information acquired from the external device; acquires a transmission start time of a first signal based on the synchronized time; a first signal transmission unit that transmits the first signal to the wireless station devices at the transmission start time; receives a second signal from the wireless station devices in accordance with the first signal; calculates a delay time; decides a timing for permitting transmission by time division to each of the wireless station devices based on the delay time of the wireless station devices; and notifies the wireless station devices of the timing that a scheduling unit has decided, where the delay time is calculated as a difference between the transmission start time from the first signal and a reception start time taken from one of the first signal or the second signal.

5. A wireless station device in a wireless communication system including an access point device and a plurality of the wireless station device that wirelessly communicates with the access point device, the wireless station device comprising:
a processor; and a storage medium having computer program instructions stored thereon, when executed by the processor, perform to:

acquires time information from an external device, and synchronizes time with the access point device based on the time information acquired from the external device; receives a first signal from the access point device; acquires a reception start time of the first signal based on the time information; transmitting, to the access point device, a second signal in which the reception start time is set, and processing of acquiring a transmission start time of the first signal at the access point device from the first signal, and transmitting, to the access point device, the second signal in which a delay time calculated from a difference between the acquired transmission start time and the reception start time is set; and effects control to receive, from the access point device, notification of a timing at which transmission by time division is permitted, decided based on a delay time, and to start transmission of a signal to the access point device at the notified timing, where the delay time is calculated as a difference between the transmission start time from the first signal and a reception start time taken from one of the first signal or the second signal.

* * * * *